United States Patent [19]

Patzelt et al.

[11] 4,201,321
[45] May 6, 1980

[54] APPLICATOR DEVICE FOR FLOWABLE REACTION MASSES

[75] Inventors: Heinrich Patzelt, Memmingen; Horst Bokelmann, Bad Wildungen, both of Fed. Rep. of Germany

[73] Assignee: Metzeler Schaum GmbH, Memmingen, Fed. Rep. of Germany

[21] Appl. No.: 871,859

[22] Filed: Jan. 24, 1978

[30] Foreign Application Priority Data

Jan. 29, 1977 [DE] Fed. Rep. of Germany ....... 2703680

[51] Int. Cl.² .............................................. B67D 5/06
[52] U.S. Cl. ................................... 222/478; 118/410; 118/415; 222/564; 239/553.3; 425/4 C; 425/224
[58] Field of Search ............... 222/478, 479, 547, 564; 239/553.3, 553.5; 198/836; 118/410, 415, 612; 401/5, 287; 425/4 C, 224; 156/78, 500

[56] References Cited

U.S. PATENT DOCUMENTS

| | | | |
|---|---|---|---|
| 2,593,610 | 4/1952 | Roberts | 198/836 X |
| 2,775,773 | 1/1957 | Marsh | 239/553.3 X |
| 2,955,955 | 10/1960 | Orr | 118/415 X |
| 3,024,893 | 3/1962 | Lambert | 198/836 |
| 3,601,320 | 8/1971 | DuPlessis | 239/553.3 X |
| 3,865,278 | 2/1975 | Gallati | 222/564 X |
| 3,899,135 | 8/1975 | O'Brian | 222/490 X |
| 4,093,125 | 6/1978 | Shatilla et al. | 239/553.5 X |

FOREIGN PATENT DOCUMENTS 1887941  2/1964  Fed. Rep. of Germany .

Primary Examiner—Robert J. Spar
Assistant Examiner—Fred A. Silverberg
Attorney, Agent, or Firm—Herbert L. Lerner

[57] ABSTRACT

Applicator device for flowable reaction masses includes a crossbeam for distributing reaction mass and lines for feeding the reaction mass to the crossbeam, the crossbeam being formed with an inner hollow chamber communicating with the feeding lines for receiving reaction mass therefrom and an outer hollow space external to the inner hollow chamber, an inner wall separating the outer hollow space and the inner hollow chamber from one another, the inner wall being formed at uppermost locations thereof with overflow openings for passage into the outer hollow space of reaction mass fed by the feeding lines into the inner hollow chamber, and an outer wall at least partly surrounding the outer hollow space and formed with discharge openings for discharge of reaction mass received in the outer hollow space from the inner hollow chamber.

3 Claims, 7 Drawing Figures

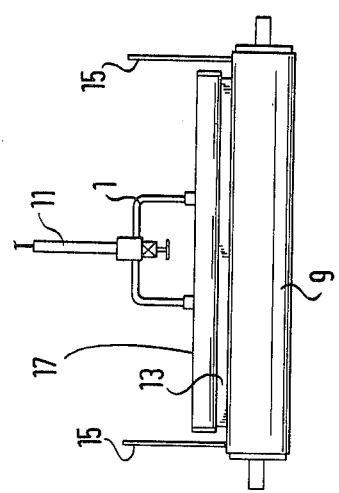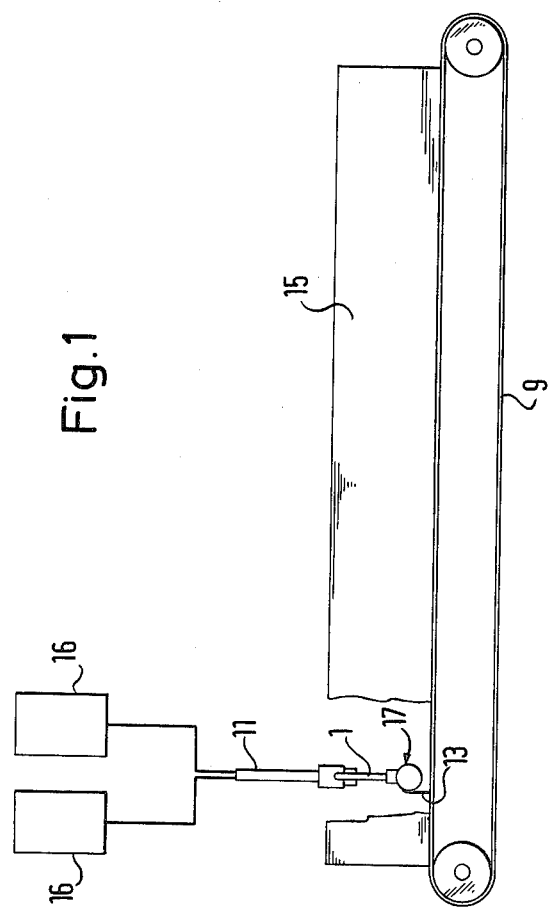

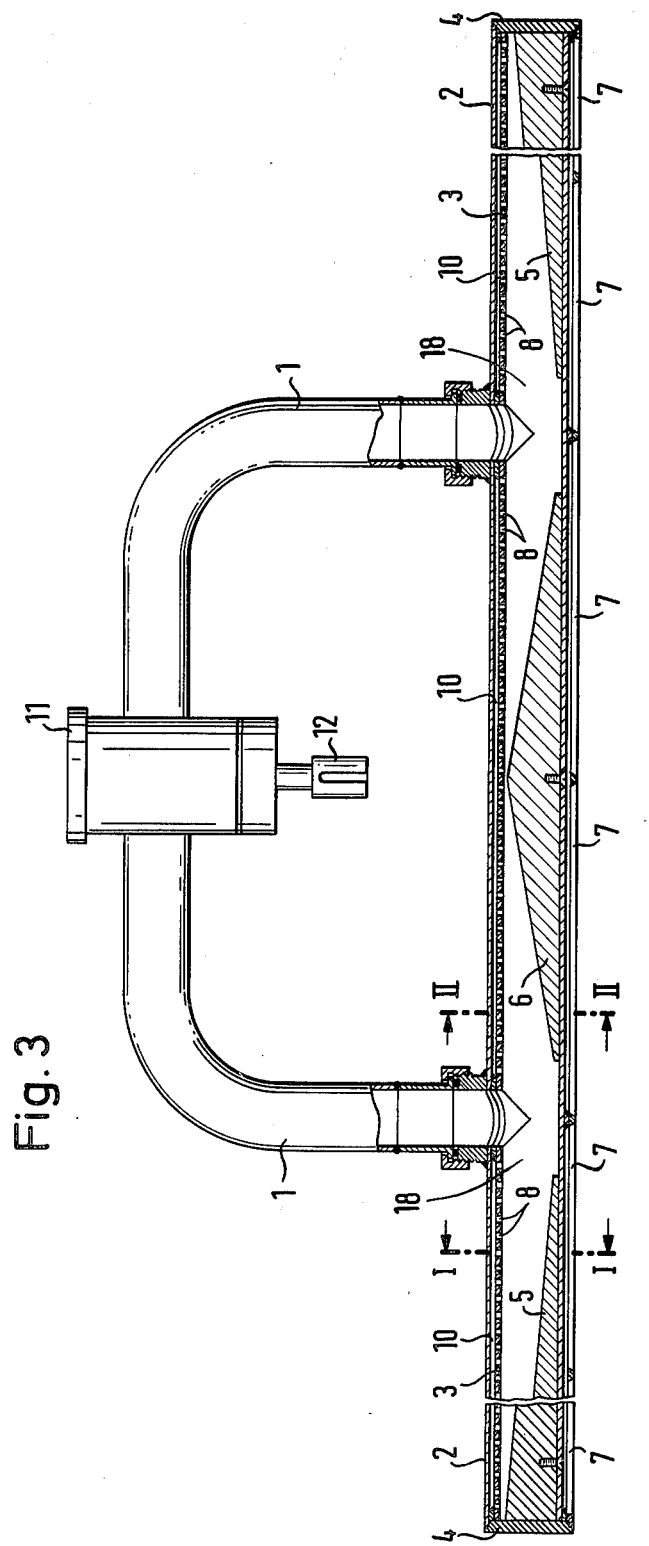

APPLICATOR DEVICE FOR FLOWABLE REACTION MASSES

The invention relates to applicator devices for flowable reaction masses, preferably foamable reaction masses.

Application devices in the form of vertical down pipes for applying foamable reaction mixtures to conveyer belts and which, at the lower opening thereof, have guidance means that extend at an inclination to the belt, have become known heretofore from German Petty Pat. No. 1 887 941. The flow of reaction mass is dispensed thereby in travel direction of the belt, however, the reaction mass is distributed therefrom in the form of a widening wedge, so that the laterally outwardly flowing portions of the applied reaction mass lag behind the reaction masses applied in the middle of the conveyer belt. As a result, the outer portions of the applied reaction mass foam up at a point in time which is behind or later than that of the simultaneously applied middle portion of the reaction mass. In the foam material being formed, this can thereby cause density differences resulting in stresses and formation of cracks in the foam material.

It is furthermore known to move the down pipes or gravity tubes reciprocatingly transversely to the travel direction of the conveyer belt while the reaction mass is being applied. This manner of application results in a deposition having a zig-zag appearance, reaction masses of varying reaction ages meeting at the respective reversal modes of the zig-zag disposition. This manner of application also involves the danger of the development of inhomogenous foam material structures.

It is an object of the invention of the instant application to provide an applicator device for flowable reaction masses, which makes possible a uniform application of the reaction mass to the conveyer belt over the entire width of the belt, so that, as viewed over the total cross section, only reaction masses of the same age or the same composition are foamed.

With the foregoing and other objects in view, there is provided, in accordance with the invention, an applicator device for flowable reaction masses comprising a crossbeam for distributing reaction mass and means for feeding the reaction mass to the crossbeam, the crossbeam being formed with an inner hollow chamber communicating with the feeding means for receiving reaction mass therefrom and an outer hollow space external to the inner hollow chamber, an inner wall separating the outer hollow space and the inner hollow chamber from one another, the inner wall being formed at uppermost locations thereof with overflow openings for passage into the outer hollow space of reaction mass fed by the feeding means into the inner hollow chamber, and an outer wall at least partly surrounding the outer hollow space and formed with discharge openings for discharge of reaction mass received in the outer hollow space from the inner hollow chamber.

The reaction mass travels from a mixing chamber through a central inlet or feed line into the inner hollow chamber and from there, through the overflow openings into the outer hollow space, and leaves the latter through the discharge openings at the lower end of the outer wall.

In accordance with other features of the invention, the cross section of the slot-like discharge openings corresponds substantially to the cross section of the outer hollow space, is smaller than the diameter of the inner hollow chamber; and the ratio of the inner diameter of the outer hollow space to the diameter of the inner hollow chamber is about 1:5 to 1:20, and preferably about 1:10. One preferred embodiment of the invention, for example, has an inner cross section of the inner hollow chamber of about 50 mm (not taking into account the conical constrictions at the outer end portions of the crossbeam) and an inner cross section of the outer hollow space of about 5 mm.

In order to ensure that, along the entire length of the inner hollow chamber, reaction mass of the same age is always present, in accordance with a further feature of the invention, the inner hollow chamber has an inner diameter decreasing with increasing distance from at least one feed line of which the reaction mass feeding means are comprised.

In accordance with additional features of the invention, the applicator device includes wedge-shaped inserts disposed in or conical construction provided in the inner hollow chamber so that part of the lower inner hollow chamber is filled thereby. The upper surface of the wedge is preferably plane. At the end of the inner hollow chamber the wedge is so thick that only about 10 to 20% of the cross-sectional area of the inner hollow chamber remains free thereat for the inflow or feed of the reaction mass.

The inner diameter of the overflow openings increases with increasing distance from the respective inlet or feed line. With an inner hollow chamber having a cross-sectional diameter of about 50 mm and an outer hollow space having a cross-sectional diameter of about 5 mm, the overflow bore-holes formed in the inner wall are, for example, 4.5 to 5 mm in cross-sectional diameter. In this manner, the reaction mass flows more rapidly in the ends of the tube than in the inlet part thereof. This ensures that reaction mass of the same age simultaneously issues from all overflow openings and is received in the outer hollow space channel, which preferably has a constant cross section. The reaction mass is fed to the traverse or crossbeam from a mixing unit through one or more inlets or feed lines. In the case where a central inlet or feed line is interposed as a connecting member between the mixing unit and the branching inlets or feed lines, the cross section of the central inlet is generally equal to the sum of the cross sections of the branching inlets or feed lines.

In accordance with a concomitant feature of the invention, a flexible apron is associated with and disposed behind the discharge openings formed in the outer wall as viewed in direction of application of the reaction masses therethrough. The apron behind the discharge nozzle openings prevents the reaction mass, which leaves the discharge nozzles, from flowing backwards behind the applicator device. This applies especially to cases wherein the reaction mixture is distributed upon a horizontal conveyer belt and not upon a slightly inclined conveyor belt.

Other features which are considered as characteristic for the invention are set forth in the appended claims.

Although the invention is illustrated and described herein as embodied in an applicator device for flowable reaction masses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic side elevational view of apparatus for producing foam materials incorporating therein the applicator device according to the invention;

FIG. 2 is an end elevational view of FIG. 1;

FIG. 3 is an enlarged fragmentary view of FIG. 2, partly in cross section and partly broken away, showing the applicator device of the invention;

Figure 4:
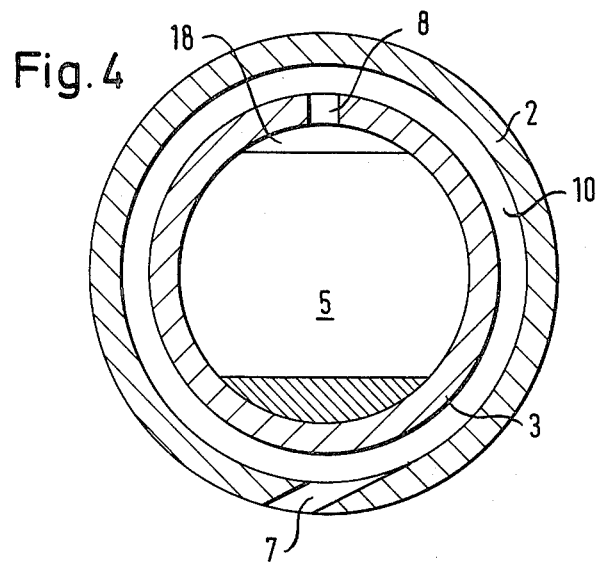
FIG. 4 is a much-enlarged cross-sectional view of FIG. 3 taken along the line I—I in direction of the arrows.

Referring now to the drawing and first, particularly, to FIGS. 1 and 2 thereof, there is shown diagrammatically a foaming apparatus formed of a transporting or conveying system 9 represented in the form of a conveyer belt. In the production of hard foam, a double conveyer belt is preferably employed.

For larger slab or panel thicknesses, side converings or guards 15 are provided. The reaction masses are supplied to a central inlet or feed line 11 from diagrammatically represented tanks 16.

FIG. 3 shows the applicator device according to the invention in a cross sectional view. The central inlet 11 divides, for example, into two branching inlets or feed lines 1 of equal length and equal cross section. The control valve 12 is associated with the location of the branching off point of the feed lines or inlets 1 from the central inlet or feed line 11. The branching feed lines or inlets 1 are connected to a crossbeam or traverse 17 by means of suitable coupling members 19, the openings of the branching inlets or feed lines 1 terminating in an inner hollow chamber 18 formed in the crossbeam 17. The crossbeam 17 which serves for uniformly applying the reaction masses over the entire width of the conveyer belt 9, is closed off at the sides thereof by preferably detachable coverings 4. The inner hollow chamber 18 of the crossbeam 17 is separated from an outer hollow space 10 in the crossbeam 17 by an inner wall 3 provided with overflow openings 8. The openings 8, which are preferably formed as hole and/or slot-shaped bores having a diameter or width which becomes larger with increasing distance thereof from the branching inlets or feed lines 1, are disposed at the highest location of the inner wall 3 of the crossbeam 17, as viewed in FIG. 1. In the inner hollow chamber 18, lateral wedges 5, which become thicker as they extend laterally outwardly, as well as middle wedges 6 are disposed, effecting an ever increasing reduction of the cross section of the inner hollow chamber 18 with increasing distance from the respective branching inlets or feed lines 1.

FIG. 4 is a cross sectional view of the traverse or crossbeam 17 at the location of the side wedge or conical rise 5. The height of the wedge 5 is about 8 mm in the cross-sectional plane of FIG. 4, and the hollow chamber 18 has at this cross-sectional plane a remaining cross section of, for example, about 42 mm. The traverse of crossbeam 17 has an outer wall 2 which, with the inner wall 3, defines the outer hollow space 10. The outer wall 2 of the crossbeam 17 is formed with a preferably continuous, slot-like discharge opening 7 at the lowest locations thereof, as shown, for example, in FIG. 4. Overflow openings 8 are provided in the inner wall 3 at the highest locations thereof, as mentioned hereinbefore. The inner hollow chamber 18 is filled partially by the lateral or side wedges 5 which increase in thickness in direction toward the side ends of the traverse or crossbeam 17. The outer hollow space 10 is supplied with reaction mass from the inner hollow chamber 18 through the overflow openings 8. The discharge openings 7 in the outer wall 2 are preferably at an inclination in discharge direction.

Figure 5:
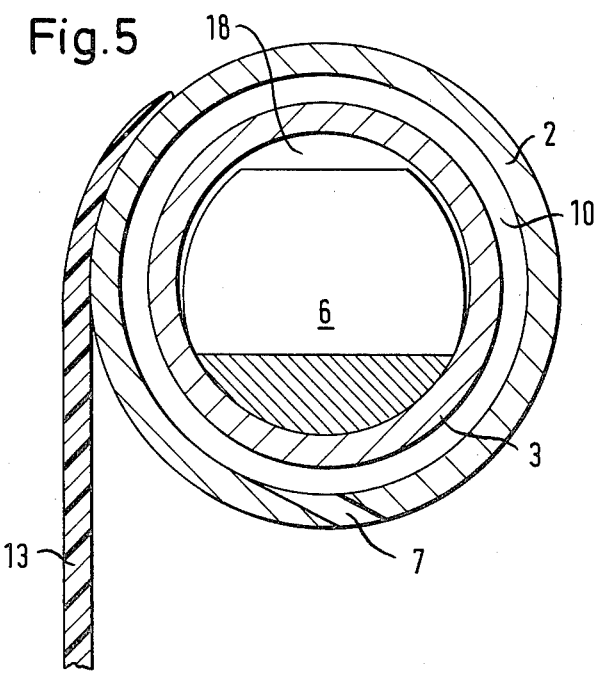
FIG. 5 is a much-enlarged cross-sectional view of FIG. 3 taken along the line II—II in direction of the arrows.

FIG. 5 is a cross-sectional view of the crossbeam or traverse 17 at the location of the middle wedge 6. In this case, the cross sectional plane is not taken through one of the upper overflow openings 8. Behind the discharge openings 7, in the direction of application of the reaction mass, a flexible apron or skirt 13 is disposed, which prevents the reaction mass from possible running behind the applicator device. This is especially important if the conveyor belts are horizontally disposed.

Figure 6:
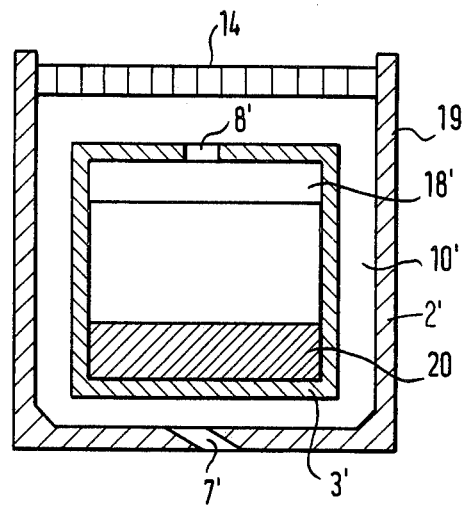
FIG. 6 is a cross-sectional view of another embodiment of the applicator device according to the invention.

FIG. 6 shows another embodiment of the crossbeam or traverse 17 in cross-sectional view. The outer wall 2' of the embodiment of FIG. 6, which has a rectangular cross section, is covered at the top thereof with a movable covering 14 and is formed in the bottom surface thereof with a discharge opening 7' passing through the bottom of the outer wall 2'. The inner tubular structure 3', which also has a rectangular cross section, is formed on the top thereof, as viewed in FIG. 6, with hole-and/or slot-shaped openings 8'. An outer hollow space 10' is located between or defined by the two tubular structures 2' and 3'. In the inner hollow chamber 18', there is disposed an inner wedge 20, the upper wedge surface of which rises from the respective non-illustrated branching inlet or feed line 1 toward the end of the traverse or crossbeam (analogously to the side wedge 5 in FIG. 3).

Figure 7:
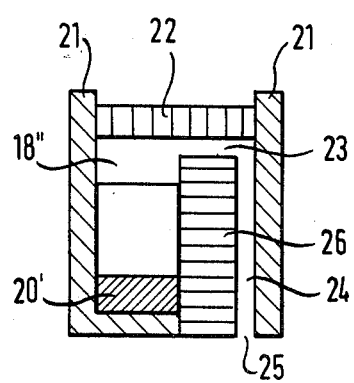
FIG. 7 is a cross-sectional view of a third embodiment of the applicator device according to the invention.

FIG. 7 shows a third embodiment of the traverse or crossbeam 17 in cross-sectional view. The outer tubular structure 21, which has a rectangular cross section, is covered at the top thereof with a movable covering 22 and has at the lowest part thereof a discharge opening 25 preferably passing through the wall thereof. The inner hollow chamber 18", in which the side wedge 20' is disposed, is connected to an outer hollow space 24 by means of hole- and/or slot-like overflow openings 23. The outer hollow space 24 is separated from the inner hollow space by an inner wall 26.

The device according to the invention for applying flowable reaction masses makes it possible to apply reaction masses of the same age simultaneously over the entire width of the conveyor belt. This ensures the production of a foam material block or a foam material sheet, plate or panel with a composition that is uniform over the entire cross section. The device furthermore permits an instantaneous change of color if the color of the reaction masses is to be changed during continuous application thereof. The applicator device according to the invention also makes it possible to change the composition instantaneously during the continuous application of the reaction mass onto the conveyer belt since, with the manner of application according to the invention, hardly any mixing of old and new reaction mass occurs.

The applicator device according to the invention affords a further advantage in that it has no tendency to become clogged, because the reaction masses are discharged in every event due to the varying cross sections of the hollow chamber 18 and the hollow space 10 in the interior of the traverse or crossbeam 17. It is further of importance that the overflow openings 8 which connect the inner hollow chamber 18 to the outer hollow space 10, are disposed at the highest location of the inner wall 3, as viewed, for example, in FIG. 4. In this manner, assurance is provided that, for example, reaction mass which may possibly foam up prematurely during the application of foam material-reaction masses, will always be discharged from the inner hollow chamber 18, and no setting of parts of the reaction mass will occur therein. The applicator device of the invention is suitable for use in the manufacture of any foam material-reaction masses. It is preferentially used for the continuous manufacture of polyurethane foam material of the soft-, semihard- and hard-foam types. When making blocks, sheets or panels of hard foam material, conventional double conveyor belts are preferentially used, as mentioned hereinbefore.

There are claimed:

1. Device for distributing a flowable, foamable reaction mass for producing polyurethane foam, the device having a crossbeam made up of two coaxial inner and outer tubes, comprising means for feeding the reaction mass to the crossbeam, an inner hollow chamber located within the inner tube of the two coaxial tubes, and an outer hollow chamber located between the inner and the outer tubes of the two coaxial tubes, said feeding means comprising at least one reaction mass feed line extending radially through said outer tube and said outer hollow chamber and terminating in said inner hollow chamber of said inner tube, wedge-shaped inserts disposed in said inner hollow chamber on opposite sides of the termination of said feed line for reducing the cross section of said inner hollow chamber, said wedge-shaped inserts being upwardly inclined in direction away from said feed-line termination, said inner tube being formed at a highermost location thereof with axially spaced overflow openings through which reaction mass fed to said inner hollow chamber is overflowable into said outer hollow chamber, said overflow openings increasing in cross section with increasing distance thereof from said feed line termination, said outer tube being formed at a lowermost location thereof with slot-like discharge openings for the reaction mass overflowing into said outer hollow chamber.

2. Device according to claim 1 wherein the discharge openings formed in said outer tube are, respectively, disposed opposite said overflow openings formed in said inner tube.

3. Device according to claim 1 wherein the inner diameter of said outer hollow chamber to the diameter of said inner hollow chamber is in a ratio of about 1:5 to 1:20.

* * * * *